Feb. 8, 1927.

J. PABST 1,617,269

CUFF LINK

Filed Jan. 30, 1926

Patented Feb. 8, 1927.

1,617,269

UNITED STATES PATENT OFFICE.

JOSEF PABST, OF ZURICH, SWITZERLAND.

CUFF LINK.

Application filed January 30, 1926, Serial No. 84,909, and in Switzerland February 6, 1925.

The present invention relates to a new and improved cuff-link.

The main object of the invention is to provide a cuff-link which can be easily opened and closed by but one hand.

A further object of the invention is to provide a device which does not open unintentionally, which is simple in construction.

In the accompanying drawings several modes of construction are shown by way of examples.

Figure 1:
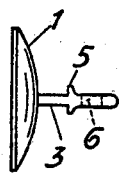
Figs. 1 and 2 show the preferred form of construction, the two parts of the cuff-links are shown in side elevation.
Figure 2:
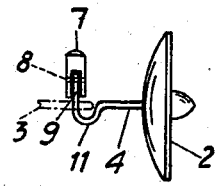
Figure 3:
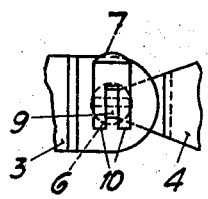
Fig. 3 shows the interlocked parts on a larger scale.

My improved cuff-link comprises the parts 1 and 2 each provided with a decorative disk. The part 1 is provided with a flat stud 3 at the centre of the disk. Said stud has projections 5 and also has an opening 6 near one end. The projections 5 prevent the part 1 from falling out of the hole of the cuff if the link is open. The second part 2 is provided with a stud 4, the end of which is bent-off at 11, and arranged at right angles to the stud as at 9. To said end piece a locking pin 7 is pivotally connected by means of a cross-pin 8, the end piece 9 projecting into a slot of the locking-pin 7. In Fig. 2 the pin 7 is shown in the position ready to be inserted in the hole 6 of the part 1; Fig. 3 shows it in the closed position of the cuff-link. The locking pin 7 after having been passed through the hole 6 is turned for about 90° and it assumes with the members 10 a position across the portion 9 above the stud 3, locking the parts 1 and 2, in their relative position. Hence both parts of the cuff button can be put together and can be dismantled in any position of the cuffs. It is therefore not necessary to bend or to form the cuffs before the parts of the button can be taken apart. It is necessary only to swing the lock-bar 7 in upright position, whereupon this part passes through the opening 6, regardless of parallel or inclined position of the parts 1 and 2 relatively to each other. An accidental disengagement of the parts will not be possible. The cuff-links shown may be used with soft cuffs as well as with stiff cuffs.

What I wish to secure by U. S. Letters Patent is:—

1. A cuff link comprising two members, each provided with a stud, the stud of one member being straight and being provided with a transverse opening and the stud of the other member being provided with an angularly related arm arranged to pass through the opening of the first named stud and a locking pin pivotally mounted on said arm at a point intermediate the ends of said pin.

2. A cuff link comprising two members, each provided with a stud, the stud of one member being straight and being provided with a transverse opening and the stud of the other member being provided with an angularly related arm arranged to pass through the opening of the first named stud and a locking pin astride of and pivotally mounted on said arm at a point intermediate the ends of said pin.

In witness whereof I affix my signature.

JOSEF PABST.